(12) United States Patent
Dussauze et al.

(10) Patent No.: US 10,919,801 B2
(45) Date of Patent: Feb. 16, 2021

(54) DEVICE AND METHOD FOR INDUCING BY THERMAL POLING A SPATIALLY CONTROLLED REFRACTIVE INDEX GRADIENT INSIDE AN AMORPHOUS INORGANIC MATERIAL

(71) Applicants: UNIVERSITE DE BORDEAUX, Brodeaux (FR); INSTITUT POLYTECHNIQUE DE BORDEAUX, Talence (FR); CENTRE NATIONAL DE LA RECHERCHE SCIENTIFIQUE (CNRS), Paris (FR); UNIVERSITY OF CENTRAL FLORIDA RESEARCH FOUNDATION, INC, Orlando, FL (US)

(72) Inventors: Marc Dussauze, Pessac (FR); Antoine Lepicard, Talence (FR); Flavie Marie Bondu, Villepinte (FR); Vincent Jean-Paul Rodriguez, Cestas (FR); Frédéric Adamietz, Le Haillan (FR); Thierry Cardinal, Salles (FR); Evelyne Claude Fargin, Gradignan (FR); Kathleen Richardson, Geneva, FL (US)

(73) Assignees: UNIVERSITE DE BORDEAUX, Bordeaux (FR); INSTITUT POLYTECHNIQUE DE BORDEAUX, Talence (FR); CENTRE NATIONAL DE LA RECHERCHE SCIENTIFIQUE (CNRS), Paris (FR); UNIVERSITY OF CENTRAL FLORIDA RESEARCH FOUNDATION, INC, Orlando, FL (US)

(*) Notice: Subject to any disclaimer, the term of this patent is extended or adjusted under 35 U.S.C. 154(b) by 117 days.

(21) Appl. No.: 16/312,759

(22) PCT Filed: Jun. 27, 2017

(86) PCT No.: PCT/EP2017/065868
§ 371 (c)(1),
(2) Date: Dec. 21, 2018

(87) PCT Pub. No.: WO2018/002058
PCT Pub. Date: Jan. 4, 2018

(65) Prior Publication Data
US 2019/0322577 A1    Oct. 24, 2019

(30) Foreign Application Priority Data
Jun. 28, 2016  (EP) ..................................... 16176689

(51) Int. Cl.
*G02B 3/00* (2006.01)
*C03C 23/00* (2006.01)

(52) U.S. Cl.
CPC .......... *C03C 23/009* (2013.01); *C03C 23/007* (2013.01); *G02B 3/0012* (2013.01); *G02B 3/0087* (2013.01)

(58) Field of Classification Search
CPC .. G02B 3/0012; G02B 3/0087; C03C 23/009; C03C 23/007
(Continued)

(56) References Cited

U.S. PATENT DOCUMENTS

2004/0013385 A1   1/2004  Brennand et al.
2016/0159684 A1   6/2016  Smith

OTHER PUBLICATIONS

International Search Report as issued in International Patent Application No. PCT/EP2017/065868, dated Aug. 8, 2017.
(Continued)

*Primary Examiner* — William Choi

(74) *Attorney, Agent, or Firm* — Pillsbury Winthrop Shaw Pittman LLP

(57) ABSTRACT

A device for inducing by thermal poling a spatially controlled refractive index gradient inside at least one amorphous inorganic material to be treated, includes a structured electrode arranged on the surface or in proximity to the surface of the material to be treated; and at least one dielectric material. The structured electrode includes at least one conductive zone and at least one non-conductive zone and it is confined between the amorphous inorganic material to be treated and the dielectric material.

18 Claims, 10 Drawing Sheets

(58) Field of Classification Search
USPC .................................................. 359/652–655
See application file for complete search history.

(56) References Cited

OTHER PUBLICATIONS

Brunkov, P. N., et al., "Submicron-Resolved Relief Formation in Poled Glasses and Glass-Metal Nanocomposites," Technical Physics Letters, American Institute of Physics, vol. 34, No. 12, Dec. 2008, XP002718946, pp. 1030-1033.
Takagi, H., et al., "Electrostatic Imprint Process for Glass," Applied Physics Express 1, Jan. 2008, Retrieved from the Internet: URL:http://iopscience.iop.org/article/10.1143/APEX.1.024003/pdf, [retrieved on Oct. 10, 2016], pp. 024003-1-024003-3.
Dussauze, M., et al., "Accurate Second Harmonic Generation Microimprinting in Glassy Oxide Materials," Advanced Optical Materials, vol. 4, No. 6, Jun. 2016, XP055308884, pp. 929-935.
Brennand, A. L. R., et al., "Planar waveguides in multicomponent glasses fabricated by field-driven differential drift of cations," Optics Letters, vol. 27, No. 11, Jun. 2002, pp. 906-908.
Fleming, L. A. H., et al., "Imprinting of glass," Optical Materials Express, vol. 5, No. 8, Aug. 2015, 8 pages.
Lipovskii, A. A., et al., "Imprinting phase/amplitude patterns on glasses with thermal poling," Solid State Ionics, vol. 181, 2010, pp. 849-855.
Rusan, V. V., et al., "A New Method for Recording Phase Optical Structures in Glasses," Glass Physics and Chemistry, vol. 36, No. 4, 2010, pp. 513-516.

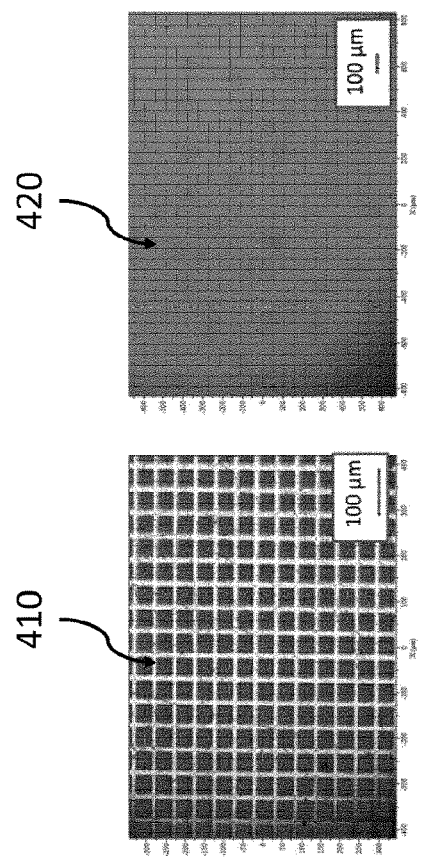
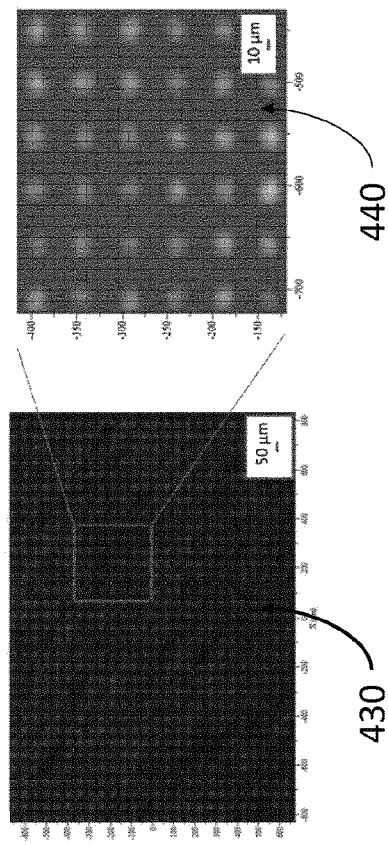
Figure 4b
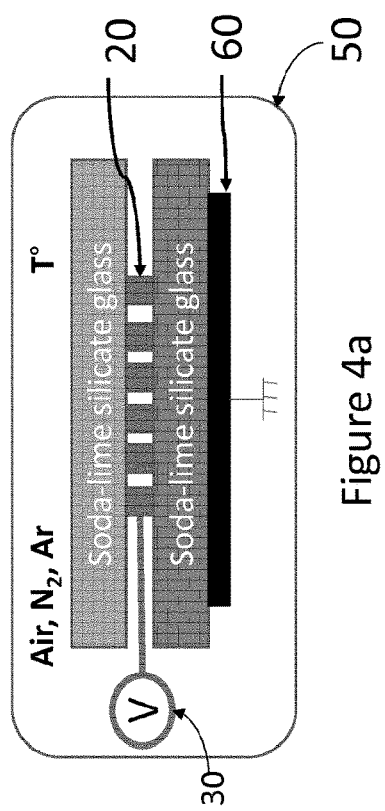
Figure 4a
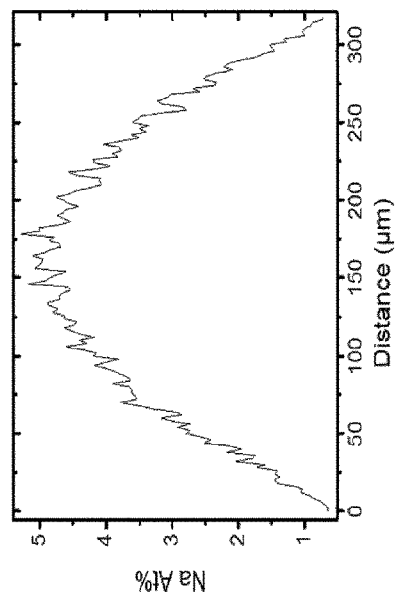
Figure 4c

DEVICE AND METHOD FOR INDUCING BY THERMAL POLING A SPATIALLY CONTROLLED REFRACTIVE INDEX GRADIENT INSIDE AN AMORPHOUS INORGANIC MATERIAL

CROSS REFERENCE TO RELATED APPLICATIONS

This application is the U.S. National Stage of PCT/EP2017/065868, filed Jun. 27, 2017, which in turn claims priority to European Patent Application No. 16176689.4 filed Jun. 28, 2016, the entire contents of all applications are incorporated herein by reference in their entireties.

TECHNICAL FIELD

The present application relates to the field of refractive index gradient structuration by thermal poling in amorphous inorganic materials. The present application relates also to a method of structuring a refractive index gradient inside an amorphous inorganic material. Moreover, the present application concerns an amorphous inorganic material comprising a spatially controlled index of refraction gradient.

STATE OF THE ART

Numerous research efforts have focused on the implementation of optical functionalities inside amorphous materials. Several results have been achieved by spatially structuring the refractive index inside a glass (see for example "Planar waveguides in multicomponent glasses fabricated by field-driven differential drift of cations", by A. L. R. Brennand et al., published in Optics Letters vol. 27 no. 1, Jun. 1, 2002).

Examples of optical components that could be obtained by tailoring the refractive index inside an amorphous material are micro-lenses or micro-lenses arrays, diffraction elements such as diffraction gratings and optical waveguides.

The spatial structuration of the refractive index in amorphous materials or glasses can be obtained, for example, by ion exchange between the heated glass and a heated liquid admixture. However, the implementation of this technique needs a careful choice of the chemical compositions of the glasses and of the liquids involved. As a result, the ion exchange technique is applicable only to few amorphous materials. Moreover the obtained optical elements are adapted only to limited portions of the electromagnetic spectrum. Furthermore the full spatial control of the refractive index gradient is impossible to achieve with this technique.

Another technique which is used for spatially structuring the index of refraction is thermal poling. Thermal poling consists in applying an electrostatic potential, with a structured electrode, to the previously heated material to be treated. Then the material is cooled down while keeping the electrostatic potential applied (see for example "Imprinting of glass" by Lauren H. Fleming et al., Optical Materials Express, Vol. 5, Page 1674, 2015; "Imprinting phase/amplitude on glasses with thermal poling" by A. A. Lipovskii et al., Solid State Ionics, Vol. 181, Page 849, 2010; "A new Method for recording Phase Optical Structures in Glasses", by V. V. Rusan et al., Glass Physics and Chemistry, Vol. 36 No 4, Page 513, 2010).

From a microscopic point of view thermal poling results in a spatial redistribution of cations inside the amorphous materials. In fact, thanks to the high temperature the ions mobility is increased. The applied potential moves the cations away from the electrodes, resulting in a redistribution of charge and mass inside the material which gives a modulation of the refractive index.

Nevertheless, thermal poling refractive index structuration as known in the prior art has several drawbacks.

In a standard thermal poling application, cations move along electric field lines which are mostly perpendicular to the surface of the material to be treated (see for example the FIG. 1 of the publication "Imprinting phase/amplitude on glasses with thermal poling" by A. A. Lipovskii et al.).

This electric field configuration strongly limits the motion of the cations in directions parallel to the surface of the material to be treated. As a consequence, the refractive index gradient is not fully controlled in the three directions of space.

This is mainly due to the step shape of the structured electrode, which results in a steep variation of the electric potential applied to the surface of the material to be treated. In fact the electric potential applied to the surface is high in correspondence of the contact regions between the electrode and the material to be treated and low where the electrode is not in contact with the surface.

The obtained refractive index profile closely follows these variations of the electric potential applied to the surface, with low refractive index in correspondence to the high potential regions and high refractive index in correspondence to low potential regions.

In standard thermal poling techniques it is possible to control the refractive index contrast between high refractive index regions and low refractive index regions, for example by controlling the intensity of the applied electric potential and the geometrical structure of the electrode.

On the contrary it is not possible to control the smoothness of the transition from a low index of refraction region to a high index of refraction region, this transition taking place quite abruptly. In other words, the refractive index gradient parallel to the material surface is not fully controlled in a standard thermal poling application.

For example with standard thermal poling techniques it is possible to obtain a refractive index modulation which closely follows the step shape of the structured electrode. On the contrary it is not possible to achieve a smoother periodic variation of the refractive index on a larger length scale, for example of the order of several hundreds of micrometers.

This is a limitation in the fabrication of optical devices obtained by thermal poling.

For example, the fabrication of arrays of micro-lenses is not possible with standard thermal poling refractive index structuration techniques.

GENERAL SUMMARY OF THE INVENTION

The present invention aims to solve these problems, for example by providing a spatial control of the refractive index gradient in three dimensions and up to a length scale of several hundreds of micrometers.

The invention describes a device for inducing by thermal poling a spatially controlled refractive index gradient inside at least one amorphous inorganic material to be treated, said device comprising a structured electrode arranged on the surface or in proximity to the surface of the material to be treated, said device being characterized in that:
  it comprises at least one dielectric material;
  the structured electrode comprises at least one conductive zone and at least one non-conductive zone and it is confined between the amorphous inorganic material to be treated and the said dielectric material.

An "amorphous inorganic material" means an amorphous material that is not derived from living matter.

In the following, the expressions "an amorphous inorganic material to be treated", "an amorphous material to be treated" or a "material to be treated" are referred to the same element and are considered as synonyms.

A "structured electrode" means an electrode having a predetermined and specifically designed shape. The structured electrode comprises at least one conductive region and at least one non-conductive region. The at least one non-conductive region connects the material to be treated and the dielectric material.

A "dielectric material" is a non-electronic conductor material.

A spatially controlled refractive index gradient means that the refractive index is controlled in the three dimensions of space.

Arranging the structured electrode on the surface of the material to be treated means that at least one portion of the structured electrode is in direct contact with the material to be treated.

Arranging the structured electrode in "proximity to the surface" of one material means that the electrode is not in direct contact with the surface but it is sufficiently close to produce an electric field inside the material to be treated. Moreover, the electric field is strong enough to generate a refractive index gradient inside the material to be treated.

The inorganic amorphous material to be treated can be formed by a stack of layers, each layer having a different chemical composition.

The dielectric material can be also formed by a stack of layers.

The invention allows a careful control of the refractive index gradient along the three dimensions of the space and especially along directions parallel to the surface of the material to be treated.

This is achieved by confining the structured electrode between the amorphous dielectric material to be treated and a second dielectric material. The confinement results in a more efficient control of the motion of the cations in the plane parallel to the surface of the amorphous material to be treated.

In the following "parallel currents" means charge currents formed by cations moving in a direction that is parallel to the surface of the material to be treated.

The presence of the dielectric material modifies the direction of the electric field lines close to the surface of the material to be treated and inside the material to be treated. This modification results in a component of the electric field parallel to the surface of the amorphous inorganic material to be treated. Thanks to this parallel component of the electric field the cations move more efficiently along the directions parallel to the surface of the amorphous material.

The refractive index of the material being directly related to the local charge and mass density, the refractive index gradient is fully spatially controlled in the material to be treated.

Moreover, due to the confinement of the electrode the formation of a plasma can be observed in the empty zones between two conductive parts of the structured electrode. The plasma enhances the displacement of charges along the directions parallel to the surface of the material to be treated. As a consequence, the plasma further increases the parallel currents. This effect greatly increases the spatial control of the refractive index gradient in the directions parallel to the amorphous material surface.

Remarkably, the refractive index variation obtained with the present invention and due to the charge and mass density redistribution can be as high as several $10^{-1}$.

It is worth noting that, depending on the composition of the material to be treated, variations of the topology of the surface can be avoided by using the device according to the invention. Preserving the flatness of the surface of the treated material is important for the realization of integrated optics elements such as micro-lenses arrays.

In a non-limiting embodiment the structured electrode comprises an electrical conductive material alternated by volumes of air or controlled atmosphere.

In a non-limiting embodiment the structured electrode is a composite material made of an alternation of conductive material and non-conductive material.

In a non-limiting embodiment the structured electrode is made of a metallic grid.

In a non-limiting embodiment the structured electrode is an electronic conductive layer deposited on an electrically insulating substrate.

In a non-limiting embodiment the structured electrode is a layer of ITO deposited on an electrically insulating substrate and structured by laser ablation.

In a non-limiting embodiment the device according to the invention comprises at least one reference electrode or cathode.

In a non-limiting embodiment the reference electrode is in contact with the material to be treated and grounded.

In a non-limiting embodiment the reference electrode is in contact with the material to be treated and connected to an electric potential different from the electric potential connected to the structured electrode.

In a non-limiting embodiment the device according to the invention comprises a first reference electrode.

In a non-limiting embodiment the device according to the invention comprises a first and a second reference electrode.

In a non-limiting embodiment the first reference electrode is connected to a first reference electric potential and it is in contact with the material to be treated and the second reference electrode is connected to a second reference electric potential and it is in contact with the dielectric material.

In a non-limiting embodiment the first reference electrode is connected to a first electric potential and the second reference electrode is connected to a second electric potential.

In a non-limiting embodiment the first and the second reference electrodes are grounded.

In a non-limiting embodiment the refractive index gradient is controlled by at least three geometrical dimensions of the structured electrode, said at least three geometrical dimensions being:
  the distance between the dielectric material to be treated and the confining dielectric material;
  the distance between two conductive zones connected to the electric potential;
  the size of the zone of the structured electrode in direct contact with the amorphous material to be treated.

In a non-limiting embodiment the distance between the dielectric material to be treated and the confining dielectric material is comprised 50 nm et 1 mm, the distance between two conductive zones is comprised between 0.1 µm and 1 mm and the size of the zone of the structured electrode in direct contact with the amorphous material to be treated is comprised between 100 nm and 1 mm.

In a non-limiting embodiment the device according to the invention comprises a gas cell for controlling the atmosphere in which the thermal poling process takes place.

In a non-limiting embodiment the gas cell keeps a constant flow of gas and/or a constant pressure.

In a non-limiting embodiment the gas used in the cell is N2, Ar or any other inert gas.

Another aspect of the invention is a method of inducing a spatially controlled gradient of a refractive index in an amorphous dielectric material comprising the following steps:
confining the structured electrode between the amorphous material to be treated and another dielectric material, said structured electrode being arranged on the surface or in proximity to the surface of the material to be treated;
performing a thermal poling treatment;
removing the electrodes.

In a non-limiting embodiment the method further comprises the following steps:
preliminary definition of the geometrical characteristics of the structured electrode in view of obtaining a given refractive index profile;
placing at least one reference electrode providing a voltage reference.

In a non-limiting embodiment during the thermal poling treatment the generation of a plasma takes place in the region of space confined between the material to be treated 10 and the dielectric material 40.

In a non-limiting embodiment the thermal poling treatment comprises the generation of a plasma in the region of space confined between the material to be treated 10 and the dielectric material 40.

In a non-limiting embodiment, the amorphous inorganic material to be treated is a chalcogenide glass or an oxide glass of the soda-lime silicate family, the dielectric material is an oxide glass of the soda-lime silicate family, the structured electrode is a thin layer of ITO deposited on an electrically insulating substrate and partially ablated to induce a structuration of alternating electrically conductive and electrically insulating zones or a nickel grid and the controlled atmosphere is formed by N2.

Another object of the invention is an inorganic material comprising a refractive index gradient controlled in the three directions of space.

In a non-limiting embodiment, the refractive index gradient is periodic in at least one direction of space.

In a non-limiting embodiment the inorganic material comprising a refractive index gradient controlled in the three directions of space is produced with the method according to the invention.

In a non-limiting embodiment the inorganic material according to the invention comprises an array of microlenses.

LIST OF FIGURES

Other aspects and advantages of the invention will become apparent by reading the following description and referring to the appended drawings:

FIGS. 4a and 4b show an application of the present invention when the structured electrode is a nickel grid and the material to be treated is a soda-lime silicate glass;

FIG. 4c shows the density of Na ions as a function of a spatial coordinate in a direction parallel to the surface of the inorganic amorphous material after the treatment induced by the present invention;

DETAILED DESCRIPTION OF THE INVENTION

Thermal poling processing of an amorphous inorganic material consists in a modification of the refractive index inside the material. This is achieved thanks to the spatial redistribution of charges and masses inside the material to be treated.

Device for Inducing the Refractive Index Gradient

Figure 1A:
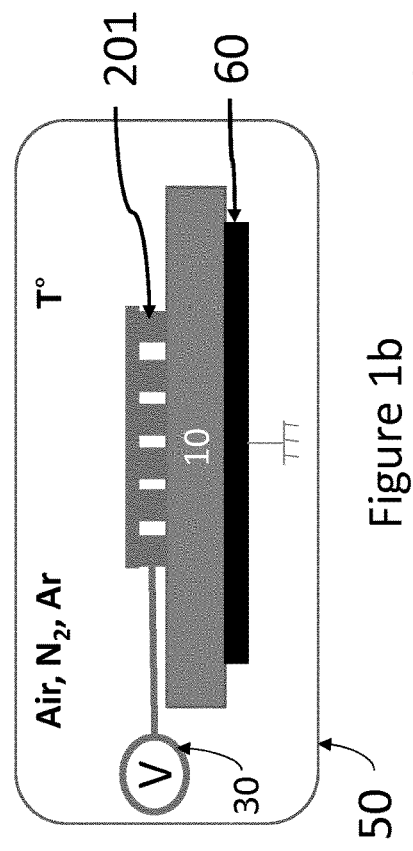
FIG. 1a shows a first configuration of the device for structuring the refractive index by thermal poling according to the present invention.
Figure 1B:
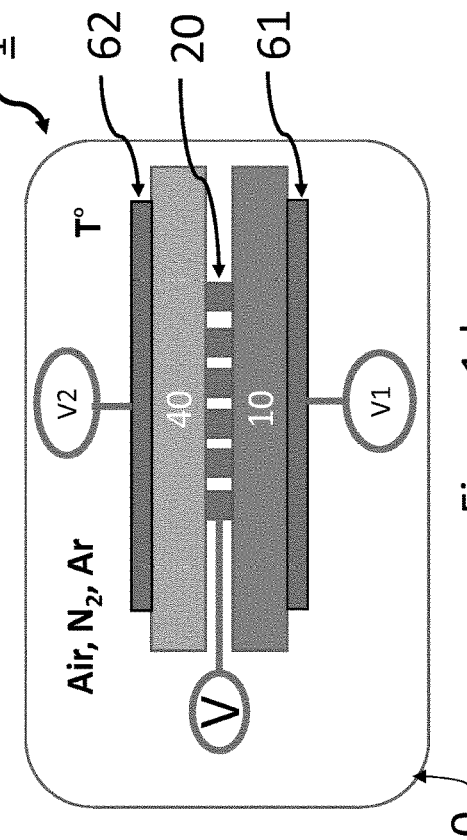
FIG. 1b shows a device for structuring the refractive index by thermal poling according to the prior art.

A standard device for thermal poling of an amorphous inorganic material 10 is showed in FIG. 1b. A structured electrode or structured anode 201 is connected to an electric potential V and it is in contact with the amorphous inorganic material to be treated 10. The amorphous inorganic material 10 is also connected to a reference electrode 60 or cathode. The reference electrode 60 can be grounded, as shown in FIG. 1b, or connected to reference electric potential.

When the temperature T is increased the mobility of the cations present in the material 10 is increased.

The cations can be naturally present in the inorganic amorphous material 10 or artificially introduced for refractive index structuring purposes. The higher is the original cations concentration, the stronger is the modulation of refractive index that can be achieved.

The device according to the invention is showed in FIG. 1a.

According to the invention the structured electrode 20 is confined between the amorphous inorganic material to be treated 10 and a dielectric material 40.

The structured electrode is considered to be confined between the material to be treated 10 and the dielectric material 40 when it is placed in a region of space delimited by the material 10 and the material 40.

Several confinement configurations are possible and correspond to equivalent realizations of the present invention. According to an embodiment the structured electrode 20 is in contact with both the surface of the material to be treated 10 and the dielectric material 40. According to another embodiment the structured electrode 20 is in proximity to the surface of one material and in contact with the other. According to another embodiment the structured electrode is in proximity to the surface of both the materials 10 and 40.

According to an embodiment the material to be treated 10 is formed by a stack of layers. Each layer in the stack can have a different chemical composition, for example a different concentration of cations.

An advantage of this embodiment is that it is possible to add a protective layer on top of the layer in which the refractive index gradient has to be induced in order to protect it from the contact with the structured electrode 20.

According to an embodiment, the dielectric material 40 is also formed by a stack of layers, each layer having a different chemical composition.

The structured electrode or structured anode 20 is connected to the electric potential V.

The reference electrode 60 can be grounded or connected to an electric potential different from the potential V.

Moreover a gas cell 50 is used to provide a controlled atmosphere in which the thermal poling process takes place.

The device 1 comprises also means for controlling the temperature of the amorphous material 10 and/or the temperature of the environment in which thermal poling takes place. Means for controlling the temperature are not shown in figures.

The confinement of the structured electrode 20 between the amorphous dielectric material 10 and the dielectric material 40 allows an improved control of the mobility of the cations parallel to the material 10 surface.

In fact the presence of the dielectric material 40 modifies the characteristics of the electric field generated by the electrode inside the amorphous inorganic material 10. The application of a positive electric potential V to the structured electrode 20 results in a redistribution of the cations.

According to an embodiment, the potential V varies between 0.1 kV and 5 kV for a slab of material to be treated 10 of thickness equal to 1 mm. This range of values of the potential V varies linearly with the thickness of the material to be treated 10. The value of the potential V depends also on the chemical composition of the material to be treated.

Figure 2B:
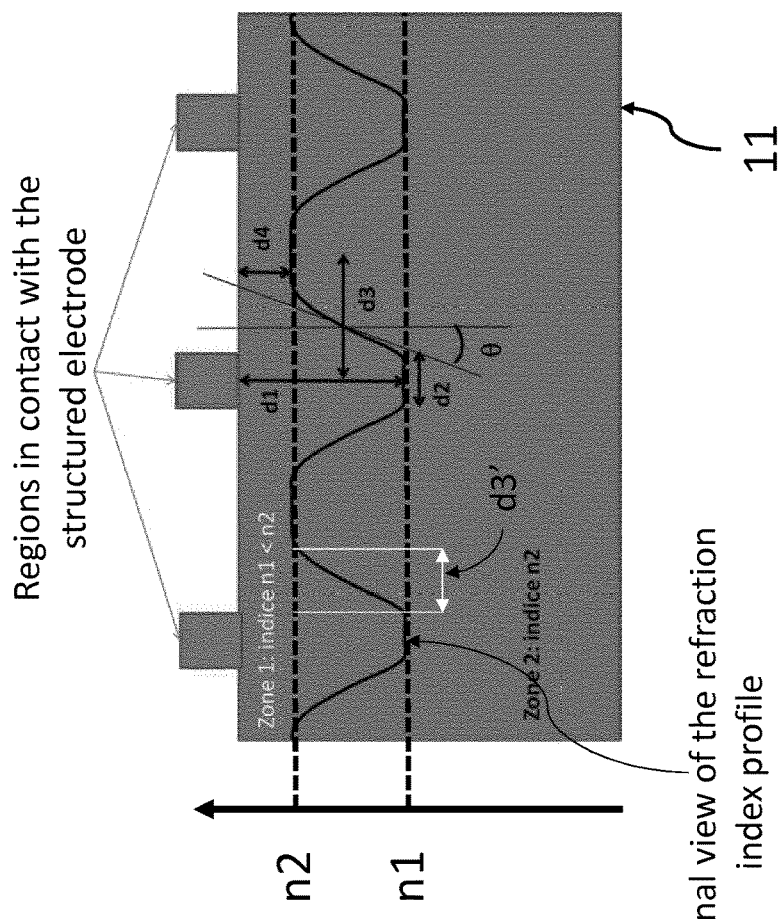
FIG. 2b shows a drawing of a sectional view of the refractive index profile obtained according to the present invention.
Figure 2A:
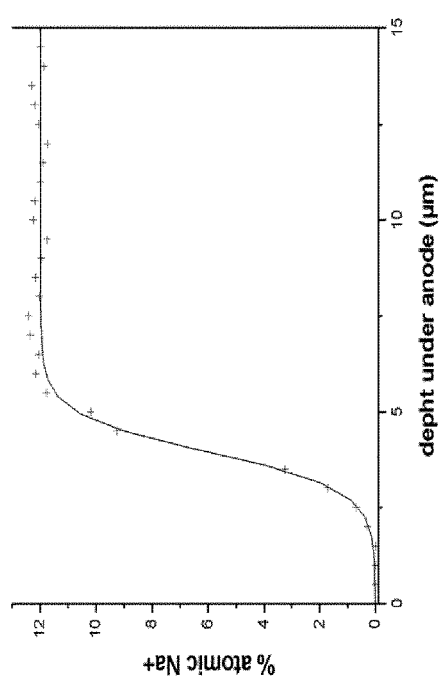
FIG. 2a shows the density of atomic $Na^+$ ions as a function of the depth under the anode.

The redistribution of cations can be measured as it is shown in FIG. 2a, where the density of Na+ ions is plotted as a function of the distance from the anode. Due to the electric repulsion between the cations and the conductive part of the electrode 20, the cations are pushed away from the surface and a depletion zone is created.

Due to the modifications in local charge and mass densities a variation of refractive index is created. An example of the structuration of refractive index according to the present invention is showed in the drawing of FIG. 2b. FIG. 2b shows a sectional view of a three dimensional refractive index profile inscribed in the material 10 using the device according to the invention. The dielectric material 40 is not shown in FIG. 2b.

It is worth to note that the cross-sectional view represented in FIG. 2b is obtained by cutting along an arbitrary direction the three dimensional refractive index profile generated inside the material 10. By choosing a different cut direction, the cross section could have a different shape but the properties discussed in the following will be the same.

The black line in FIG. 2b represents the value of the refractive index at a given point inside the material. The arrow d1 shows the depth—measured from the surface—of the low refractive index region in correspondence of a contact between the structured electrode and the material to be treated. The arrow d4 shows the depth—measured from the surface—of the high refractive index region in correspondence of a region in which there is no contact between the structured electrode and the material to be treated. The arrows d3 or d3' shows the distance on which the refractive index varies from a low value to a high value. The angle theta measures the steepness of the transition of the refractive index profile in going from a low index region towards a high index region.

An advantage of the present invention is the possibility of controlling the parameters d1, d2, d3, d3', d4 and B. In other words the invention makes it possible to control the refractive index gradient in the three dimensions of the space. This flexibility in the shape of the refractive index profile is not achieved with a standard thermal poling device.

For example, in a standard thermal poling device such that showed in FIG. 1b, the angle theta and the distance d3 or the distance d3' are very small. This means that the transition from a low refractive index region to a high refractive index region is very steep.

Figure 1C:
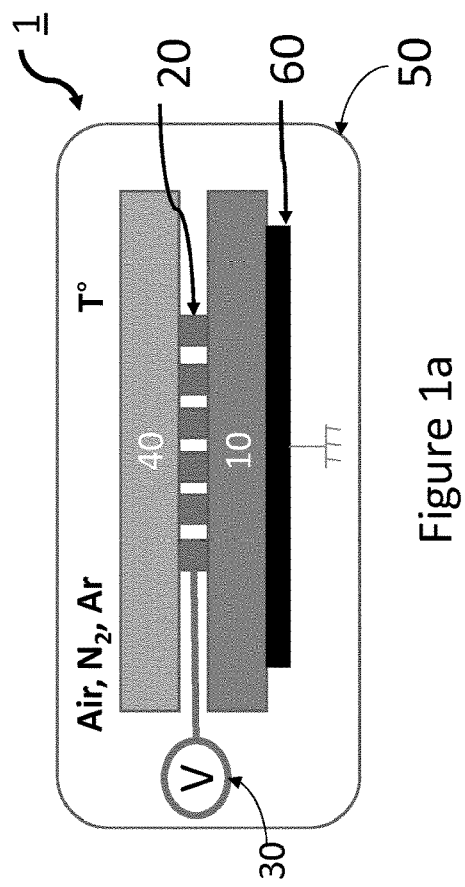
FIG. 1c shows a second configuration of the device according to the present invention.
Figure 1D:
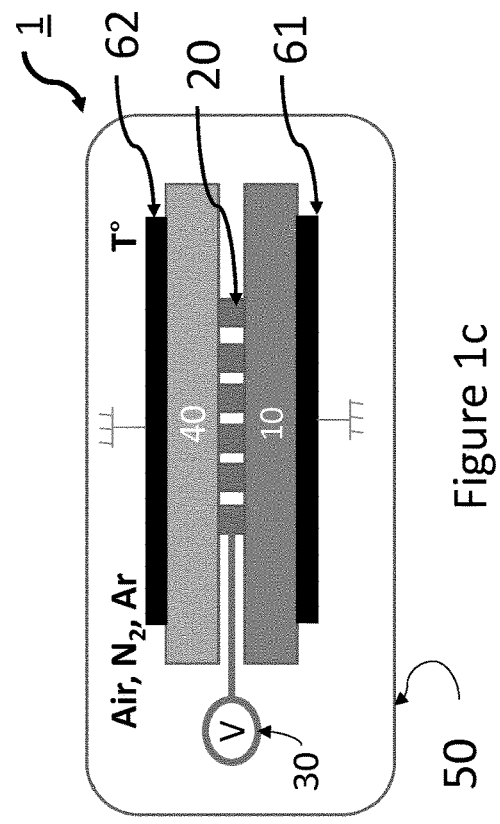
FIG. 1d shows a third configuration of the device according to the present invention.

With standard thermal poling technique it is impossible to increase the distance d3 up to several hundreds of micrometers, the transition from low to high refractive index being always steep The present invention solves this problem with the device 1 showed in FIG. 1a, 1c or 1d, allowing values of d3 or d3' comprised between 0.1 µm and 1 mm and correspondingly higher values of theta. Particularly the present invention allows a three dimensional control of the refractive index gradient with d3' comprised between 0.1 µm and 500 µm.

It is worth noting that the kind of refractive index profile obtained with the present invention can be used to create an array of micro-lenses embedded in the material 10. Nevertheless, with standard thermal poling the fabrication of arrays of micro-lenses is not achievable due to the fact that it is difficult to control the spatial gradient across the direction identified by the distance d3 in FIG. 2b.

The three dimensional control of the refractive index gradient showed in FIG. 2b is achieved by the present invention thanks to the control of the electric field lines inside the material to be treated.

Figure 3A:
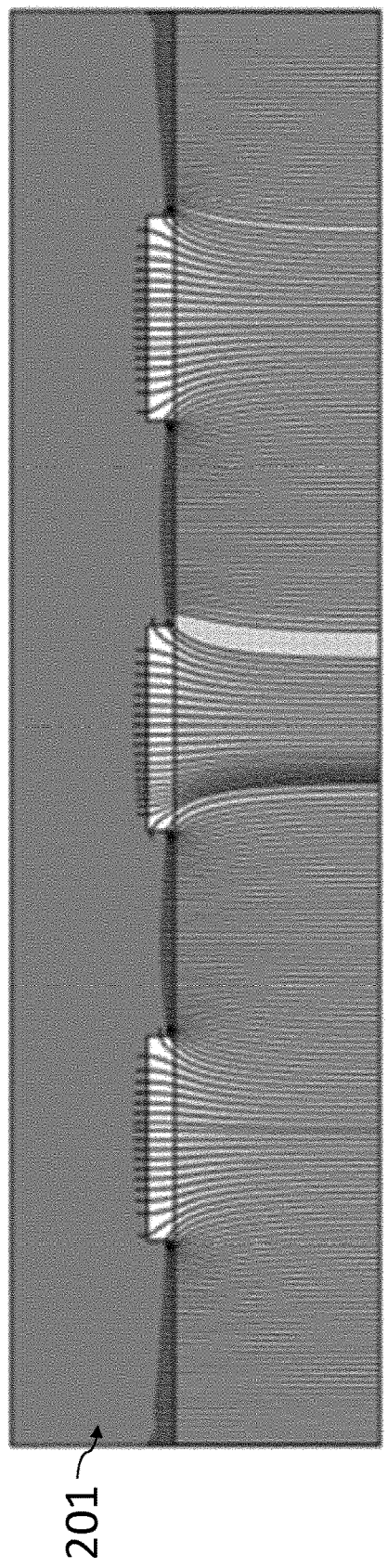
FIG. 3a shows the electric field lines in a standard thermal poling configuration.
Figure 3B:
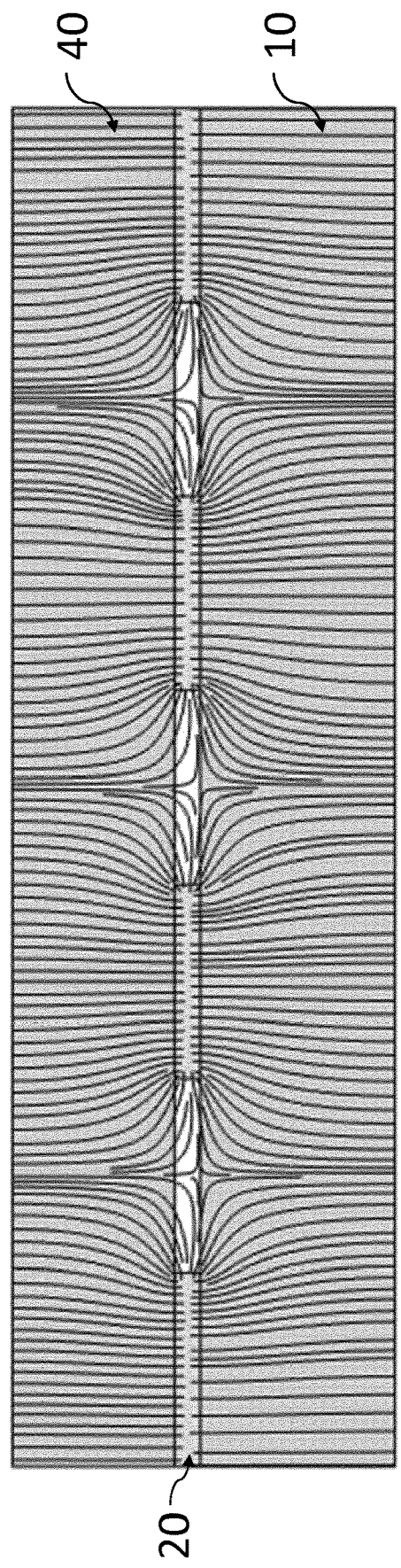
FIG. 3b shows the electric field lines in the thermal poling configuration described by the present invention.

The modification of the electric field due to the confinement is evident by comparing FIGS. 3a and 3b. FIGS. 3a and 3b are simulations obtained by computing the electric field lines generated by the structured electrode 20 when an electrostatic potential V is applied to it.

FIG. 3a shows the electric field lines generated by a standard device for thermal poling, like the device showed in FIG. 1b.

The structured electrode 201 being an electrical conductor, the electric field lines are nearly perpendicular to its surface. As a consequence, the electric field inside the material 10 is almost normal to the surface of the amorphous inorganic material 10.

FIG. 3b shows the electric field lines generated by the device for thermal poling according to the present invention and showed in FIG. 1c.

When the structured electrode 20 is confined between the dielectric 40 and the inorganic dielectric material 10 the direction of electric field lines changes. More specifically inside the amorphous inorganic material 10 electric field lines are almost parallel to the surface of the material 10. This means that a non-zero component of the electric field parallel to the surface is present.

The parallel component of the electric field of FIG. 3b is responsible for the better control of the parallel displacement of cations resulting in a better control of the refractive index gradient inside material 10.

Moreover the formation of a plasma can be observed in the space between the amorphous inorganic material 10 and the dielectric material 40. The plasma enhances the transport of charges inside the material 10 resulting in a further improvement of the parallel displacement of the cations.

According to an embodiment showed in FIG. 1c, two reference electrodes 61 and 62 are used. The reference electrode 61 is in contact with the material to be treated 10 and the reference electrode 62 is in contact with the dielectric material 40. Both the reference electrode are grounded or connected to the same electric potential different from the electric potential V connected to the structured electrode 20.

An advantage of the configuration showed in FIG. 1c is to gain a better control on the parallel components of the electric field inside the material to be treated 10.

Another embodiment of the device 1 according to the present invention is showed in FIG. 1d. In this case the two reference electrode 61 and 62 are connected to different reference electric potential V1 and V2. The reference electric potentials V1 and V2 can be different or equal.

An advantage of the configuration showed in FIG. 1d is to gain a better control on the direction of the electric field inside the material to be treated 10.

Structured Electrode

The structured electrode 20 comprises an electrical conductive material alternated by volumes of air or controlled atmosphere.

In a non-limiting embodiment the structured electrode 20 is a metallic grid, like the nickel grid showed in FIG. 4b.

An advantage of this embodiment is to design the electric field inside the amorphous inorganic material to be treated 10 in order to obtain a parallel component of the electric field.

Another advantage of this embodiment is to allow the creation of a plasma in the volumes of air or controlled atmosphere, the plasma further enhancing the parallel electric currents in the amorphous inorganic material 10.

In a non-limiting embodiment the structured electrode 20 can also be a layer of ITO (Indium Tin Oxide) deposited on an electrically insulating substrate and structured by laser ablation.

Figure 6:
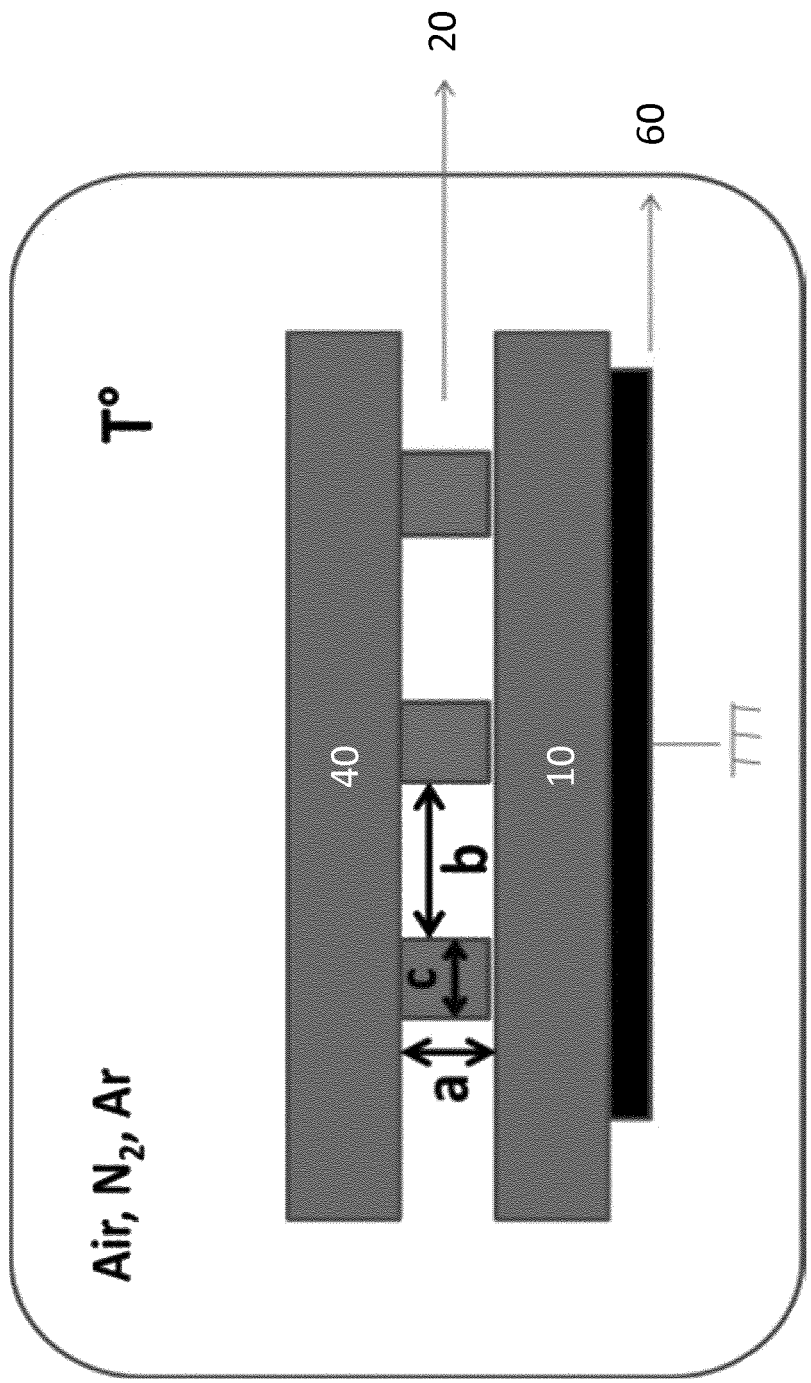
FIG. 6 shows the relevant geometrical parameters of the structured electrode.

An example of the geometrical structure of the electrode 20 is showed in FIG. 6. It is characterized by the values of three parameters:

the distance a between the dielectric material to be treated 10 and the confining dielectric material 40;

the distance b between two conductive zones connected to the electric potential;

the size c of the zone of the structured electrode 20 in direct contact with or in proximity to the amorphous material to be treated 10.

By carefully choosing the distances a, b and c together with the other relevant parameters of the thermal poling process it is possible to directly control the spatial features of the refractive index profile inscribed inside the material to be treated 10.

More specifically the geometrical parameters of the structured electrode 20 and the other physical parameters of the thermal poling process are related to the distances d1, d2, d3, d3' and to the angle θ of FIG. 6.

For example the distance c is related the distance d2 of FIG. 6. The distance d1 is controlled by the electric potential V applied to the structured electrode. Finally, the distance d3 or d3' depends on the amount of parallel current generated in the material 10 during the process. The amount of parallel current is in turn determined by several parameters like the amount of plasma generated, the applied potential V, the applied temperature T and others.

According to an embodiment the distance a between the dielectric material to be treated 10 and the confining dielectric material 40 is comprised between 50 nm and 1 mm.

The size of the gap a between the material to be treated 10 and the dielectric material 40 controls the amount of plasma that is formed during the thermal poling process.

The bigger is the gap a, the bigger is the amount of plasma that is formed, increasing parallel currents in the material 10.

According to an embodiment of the present invention the distance b between two conductive zones is comprised between 0.1 μm and 1 mm and the size c of the zone of the structured electrode 20 in direct contact with the amorphous material to be treated 10 is comprised between 100 nanometers and 1 mm.

An advantage of the choice of small values for b is to obtain a structuration of the refractive index on a small length.

Controlled Atmosphere

According to another embodiment of the present invention the device 1 comprises a gas cell 50 for controlling the atmosphere in which the thermal poling process takes place.

The use of a controlled atmosphere is useful for limiting the exchange of charges between the gas forming the controlled atmosphere and the material to be treated 10 during the thermal poling process.

For example if the process takes place in air, contamination of the material 10 due to ions coming from the air is possible, caused by the presence of water in the air. These effects are detrimental to the realization of a precise refractive index profile inside the material.

On the contrary, when the thermal poling process takes place under vacuum, there is no plasma formation in the gap between the inorganic amorphous material 10 and the dielectric material 40. The device 1 becomes then less efficient in generating parallel currents in the material 10.

A good choice for the controlled atmosphere is an inert gas. Example of inert gases are N2 or Ar. The choice of these inert gases limits the charge transfer from the gas to the material to be treated 10. Nevertheless the gas allows the formation of the plasma in the gap, which is beneficial for the enhancement of parallel currents in the material 10.

According to another embodiment of the present inventions the gas cell 50 keeps a constant flow of gas and/or a constant pressure.

The device 1 includes also means (not shown) for regulating the parameters of the controlled atmosphere inside the gas cell 50. The parameters include gas composition, gas temperature, gas density and pressure among others. The means for regulating the controlled atmosphere includes pressure control device, temperature control device, gas composition control device and can be placed outside or inside the gas cell.

Method for Inducing the Refractive Index Gradient

Figure 7:
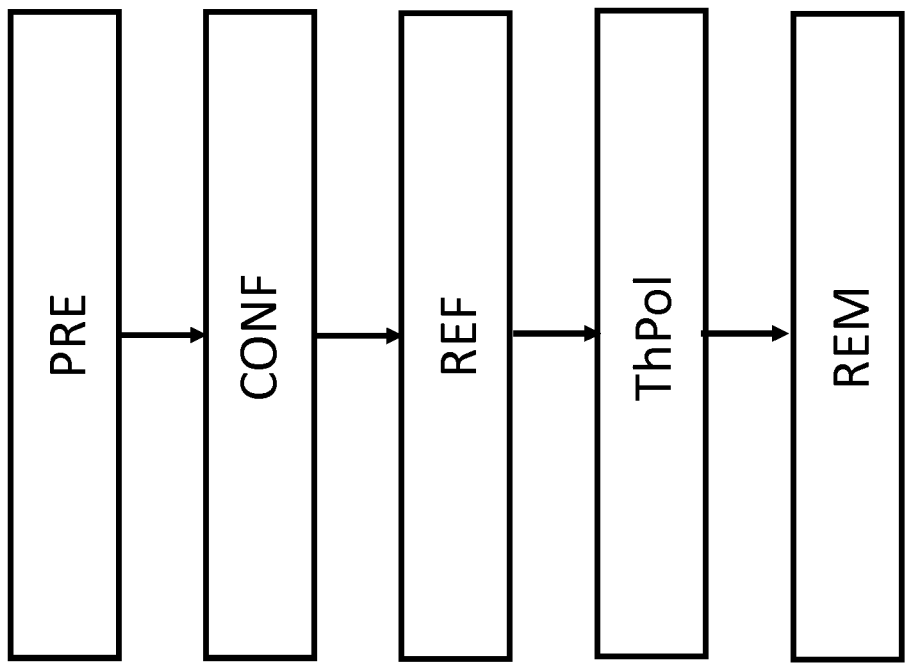
FIG. 7 shows the steps involved by the method for the implementation of the present invention.

A part of the present invention is a method 100, showed in FIG. 7, for inducing by thermal poling a spatially controlled gradient of a refractive index in an amorphous dielectric material 10 comprising at least the following steps:

preliminary definition PRE of the geometrical characteristics of the structured electrode 20 in view of obtaining a given refractive index profile;

confining CONF the structured electrode 20 between the amorphous material to be treated 10 and another dielectric material 40, said structured electrode being arranged on the surface or in proximity to the surface of the material to be treated 10;

placing REF at least a reference electrode 60 providing a voltage reference;

performing ThPol a thermal poling treatment;

removing REM the structured electrode 20.

The preliminary step PRE consists in the definition of the geometrical characteristics of the structured electrode 20.

The choice of the geometrical characteristics of the structured electrode 20 together with the other physical parameters of the thermal poling process is done in view of the refractive index profile to be inscribed in the inorganic amorphous material 10.

It is important to note that the tuning of the geometrical characteristics of the structured electrode 20 offer several degree of freedom for tailoring the desired refractive index profile inside the material 10.

The step CONF consists in confining the structured electrode between the material to be treated 10 and the dielectric material 40 and it is particularly useful for the enhancement of the parallel currents inside the material 10.

During the step CONF the confinement of the structured electrode 20 can be realized according to one of the several configurations described above.

The parallel currents are necessary in order to spatially control the refractive index gradient along the directions parallel to the surface of the material 10.

Moreover the confinement of the electrode 20 creates a gap between the material to be treated 10 and the dielectric material 40. This gap allows the creation of a plasma during the thermal poling process. The plasma further enhances the parallel currents inside the material to be treated 10.

In other words the thermal poling treatment ThPol comprises the generation of a plasma in the region of space confined between the material to be treated 10 and the dielectric material 40.

Due to the confinement between the two dielectric materials 10 and 40, the plasma can propagate along greater distances. This makes it possible to obtain variation of the refraction index along distances up to 1 mm and to gain a better control of the refractive index gradient on the three directions of space.

The step REF consists in placing at least a reference electrode 60. The electrode 60 provides a voltage reference during the thermal poling process, for example it can be grounded or connected to a potential different from V.

When the second configuration of FIG. 1c is used, two reference electrode 61 and 62 are placed during the step REF. The electrode 61 is placed in contact with the material to be treated 10 and the electrode 62 is placed in contact with the dielectric 40. The reference electrode 61 and 62 can be grounded or connected to an electric potential different from V.

When the third configuration of FIG. 1d is used, two reference electrode 61 and 62 are placed during the step REF. In this case the two reference electrodes 61 and 62 are connected to the reference electric potentials V1 and V2.

The step ThPol consists in performing a thermal poling process.

During a thermal poling process the temperature of the material to be treated 10 is increased up to few hundreds of degrees Celsius. The raise in temperature increases the mobility of the cations facilitating their displacement and the charge redistribution inside the material 10.

In order to change the cations distribution inside the material to be treated 10, an electric potential V is applied through the structured electrode 20. Other electric potentials V1, V2 can be applied through the reference electrodes 61,62.

The choice of the temperature T and of the electric potentials V, V1, V2 is critical in order to obtain the desired refractive index profile. For a given target refractive index profile, the values of these parameters depend on the material to be treated 10 and on the dielectric material 40.

When the target refractive index profile is obtained, the material to be treated is cooled while keeping the structured electrode 20 at potential V.

The step REM consists in removing the structured electrode 20 and/or the dielectric material 40 and/or the reference electrodes 60, 61, 62.

This step is necessary in order to recover the material 11 inside which the refractive index has been structured. The material 11 is the material to be treated 10 after treatment. For example, the optical elements embedded in the material 11 can be used after the step REM.

According to an embodiment the reference electrode 60 can be placed on the surface of the material 10 which is not in contact with the structured electrode 20, as it is showed in FIG. 1a. The reference electrode 60 can be grounded or connected to a potential different from V.

According to another embodiment two reference electrodes 61, 62 can be used as showed in FIG. 8a. For example, the first reference electrode 61 is connected to the material to be treated 10 and the second reference electrode 62 is connected to the dielectric material 40. When two reference electrodes 61, 62 are used, they can be connected to two different electric potentials V1 and V2.

The electric potentials V1 and V2 can have the same value.

It is worth noting that connecting the structured electrodes 61, 62 to different electric potentials V1, V2 change the symmetry of the electric field lines of FIG. 3b. As a consequence, the values of electric potential V, V1 and V2 can be adjusted in order to better control the charge currents inside the material 10.

The configurations showed in FIGS. 1a, 1c and 1d correspond to a slightly different orientation of the electric field lines inside the material 10. The choice between these different configurations is made based on the target refractive index profile and the composition of the inorganic amorphous material to be treated 10

The choice of the dielectric material 40 plays also a role in defining the direction of the electric field lines around the structured electrode 20 and also inside the amorphous material to be treated 10. For example by choosing dielectric material 40 with different resistivity the direction of electric field lines can be changed. The resistivity of the dielectric material 40 is then another parameter that can be used to regulate parallel currents inside the material to be treated 10.

According to an embodiment of the present invention the amorphous inorganic material to be treated 10 is a chalcogenide glass or an oxide glass of the soda-lime silicate family, the dielectric material 40 is an oxide glass of the soda-lime silicate family, the structured electrode 20 is a thin layer of ITO deposited on an electrically insulating substrate and partially ablated to induce a structuration of alternating electrically conductive and electrically insulating zones or a nickel grid and the controlled atmosphere is formed by N2.

Chalcogenide glass and oxide glass of the soda-lime silicate family include a wide range of materials whose optical properties cover a large portion of the electromagnetic spectrum.

Choosing the material to be treated inside this family allows a great versatility. In fact it is possible to obtain optical devices working in a given electromagnetic window.

For example chalcogenide glasses are transparent in infrared light, allowing applications for which other materials are not suited.

It has to be noted that these materials are only examples of materials on which the method according to the invention can be applied. In principle every inorganic amorphous material is well suited for a thermal poling refractive index structuration according to the present invention.

Choosing the fabrication technique of the structured electrode 20 allows also a great versatility of the method according to the present invention. In fact several shapes and geometrical dimension of the electrode can be selected.

For example, the structured electrode 20 can be obtained by laser ablation of a thin layer of ITO deposited on a glass. An example 510 of such an electrode is visible in FIG. 5b. In this case the thickness of the ITO layer is about 100-200 nm, resulting in a gap a between the material to be treated 10 and the dielectric 40 (in this case a glass) of the same size.

Material with an Induced Refractive Index Gradient

An aspect of the present invention concerns an amorphous inorganic material 11 comprising a controlled refractive index gradient in the three directions of space.

According to an embodiment, the refractive index gradient is a periodic function of at least one spatial coordinate.

In a non-limiting embodiment the amorphous inorganic material 11 comprises a refractive index modulation resulting in an array of micro-lenses.

The optical range in which the micro-lenses array can be used is determined by the composition of the inorganic amorphous material to be treated 10.

The optical properties of the micro-lenses array are determined by the geometrical properties of the structured electrode 20, which in turn determine the refractive index profile. The optical properties of the micro-lenses array are also determined by the parameters of the thermal poling process (temperature, electric potentials, duration of treatment).

The optical properties of the micro-lenses array that can be tailored are for example: the focal length of the micro-lenses, the distance between two adjacent lenses, the shape of the micro-lenses and the positioning of the micro-lenses.

An advantage of the present invention is to obtain an array of micro-lenses in which the distance between two adjacent lenses of the array is well controlled. In other words, the array of micro-lenses obtained with the present invention has a filling factor controlled by the design of the structured electrode 20.

Another advantage of the present invention is to control the shape of the lenses forming the array. For example, octagonal lenses can be inscribed in the material 10, which makes it possible to increase the filling factor of the micro-lenses array up to values close to 1.

Thanks to the spatial control of the refractive index gradient, several optical devices can be embedded in such an amorphous inorganic material. Interestingly, these optical devices can have micrometric size and are adapted to the implementation of integrated and tailored optical functionalities.

Examples of optical devices obtained with the present invention are micro-lenses arrays, optical diffraction elements and optical waveguides.

According to another embodiment of the present invention the characteristic length d3' in the variation of the refractive index along a direction parallel to the contact surface between the structured electrode and the amorphous inorganic material 10 is comprised between 0.1 µm and 500 µm.

The characteristic length d3 or d3' is a measure of the length on which the refractive index varies.

This characteristic length d3 or d3' is measured along a direction that is parallel to the surface of the material to be treated 10.

According to another embodiment of the present invention an amorphous inorganic material 11 is produced with the method 100 described above.

The realization of such a small device by thermal poling would not be possible without the technical improvement disclosed by the present invention.

FIGS. 4a and 4b show a typical application of the present invention. In this case both the amorphous inorganic material to be treated 10 and the dielectric material 40 are glasses of the soda-lime silicate family. Due to their transparency properties, these materials are particularly useful for applications using visible light.

The structured electrode 20 used in this case is a nickel grid 410. An optical image of the surface of the glass after treatment is represented by 420. Topological variations of the surface due to the thermal poling treatment are not visible in this case. FIG. 430 shows that an array of micro-lenses is formed inside the material after the treatment. The center of each micro-lens in 430 corresponds to a hole of the grid 410. FIG. 440 is a zoom of FIG. 430 showing the spatial separation between adjacent micro-lenses. FIG. 4c shows the spatial concentration of Na ions after the treatment. The bell-shaped profile corresponds to one micro-lens.

Figure 5B:
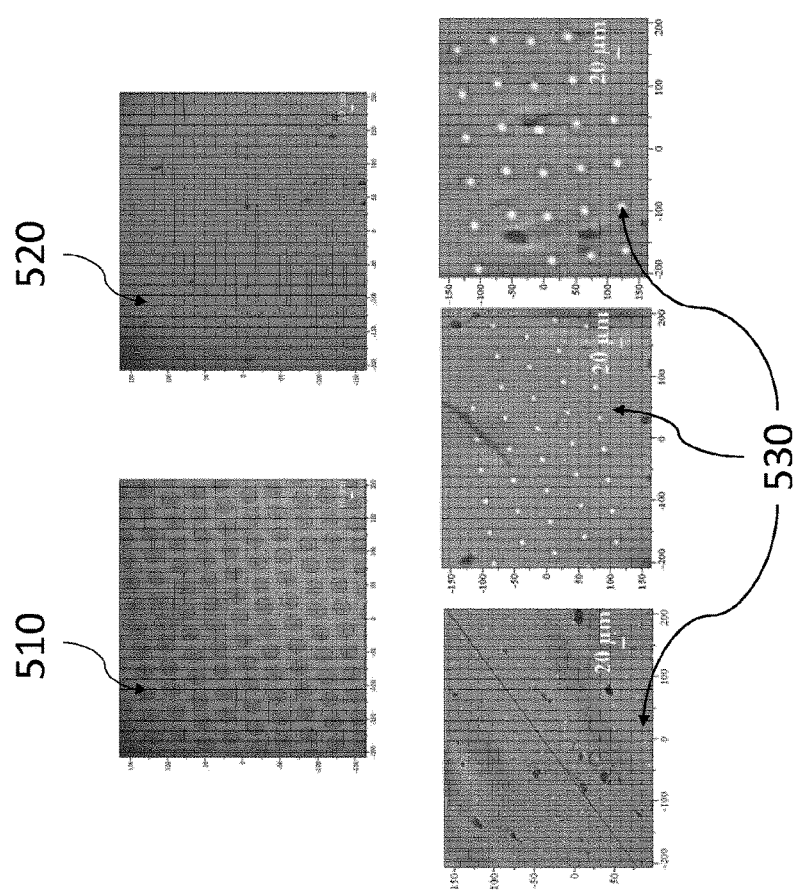
FIGS. 5a and 5b show an application of the present invention when the electrode is a thin layer of ITO structured by laser ablation and the material to be treated is a chalcogenide glass.
Figure 5A:
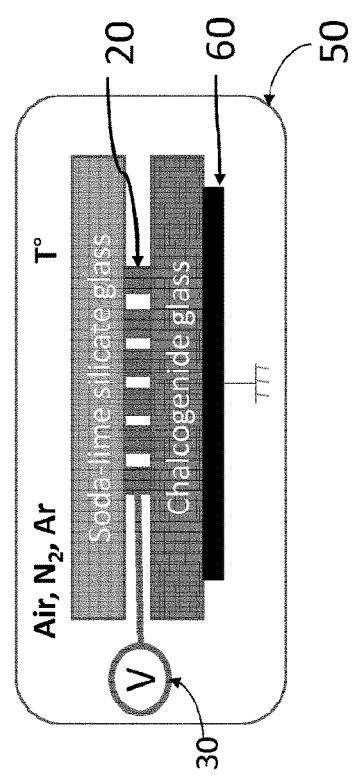

Another example of an amorphous inorganic material 10 inside which the refractive index has been structured according to the present invention is showed in FIG. 5b.

In this case the material to be treated 10 is a chalcogenide glass and the structured electrode 20 is the laser ablated thin ITO layer 510. The circular holes correspond to controlled atmosphere volumes when the electrodes is placed on the surface of the material to be treated 10. The region between adjacent circular holes are the conductive zones of the structured electrode 20 that are in contact with the material to be treated 10.

520 shows the surface of the material after the thermal poling process. Remarkably, no topologic alterations are detected on the surface of the glass.

On the contrary, the refractive index inside the material is not homogeneous as it is showed in 530. Each of the bright spot corresponds to a high refractive index region, which is the center of a micro-lens. The center of each micro-lens corresponds to the center of one of the holes visible in 510. Several array with different periodicity are showed in 530.

The results showed in 530 demonstrate that the refractive index structuration obtained with the present invention is strong enough to produce an array of micro-lenses.

It is also worth to note that the arrays in 530 contain several rows and columns of micro-lenses. The invention is well adapted for the simultaneous structuration of a large portion of the material 10.

Figure 8:
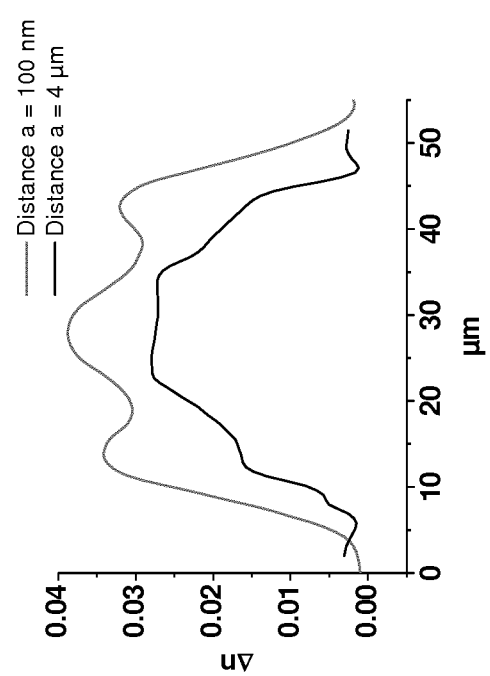
FIG. 8 shows the influence of the geometrical parameter a on the refractive index profile.
Figure 9:
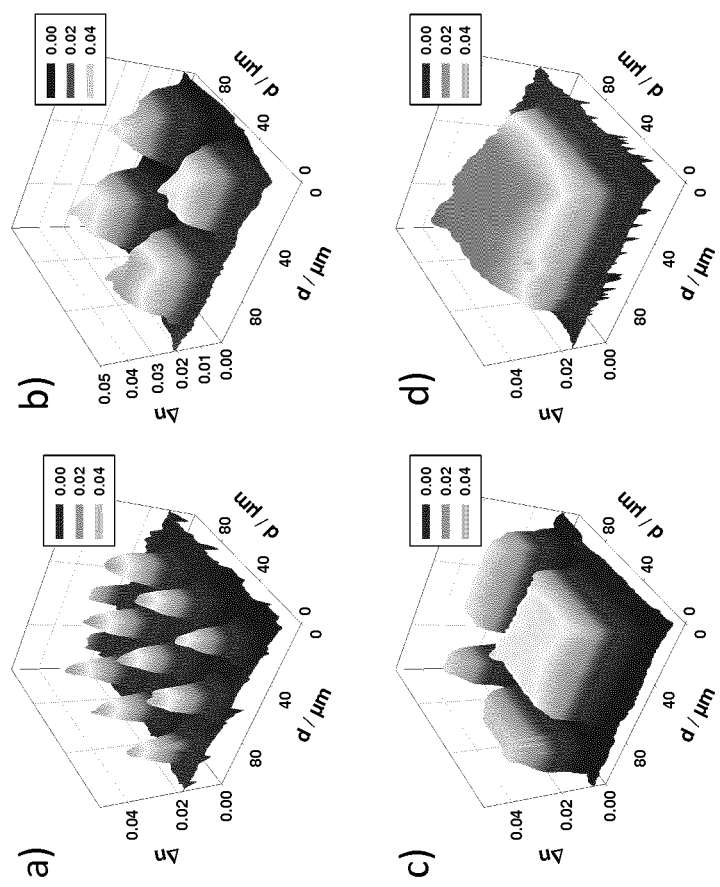
FIG. 9 shows the influence of the geometrical parameter b on the refractive index profile.
Figure 10:
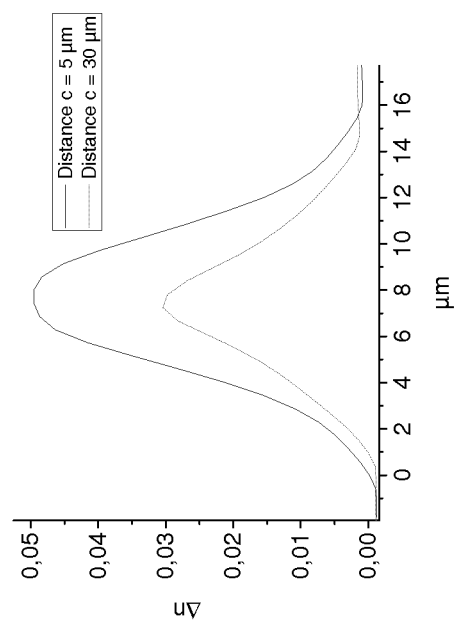
FIG. 10 shows the influence of the geometrical parameter c on the refractive index profile.

FIGS. 8, 9 and 10 illustrate respectively some examples of the influence of parameters a, b and c of the electrode geometry, shown in FIG. 6, on the refractive index profile. The refractive index variations were measured with the Phasics SID4bio device on both a chalcogenide and a soda lime glasses.

Influence of the Parameter a.

FIG. 8 presents the refractive index variations obtained on a soda lime glass poled with two different electrodes geometry having two values of parameter a=0.1 µm and 4 µm.

Both electrode have equivalent parameters b=40 µm and c=11 µm

Similar thermal poling treatment conditions were used: 300° C., 1 kV, under N2 atmosphere.

Influence of the Parameter b.

FIG. 9 presents the 3D refractive index variations obtained on soda lime glasses thermally poled with structured electrodes having different parameters b=20 µm, 40 µm, 60 µm and 80 µm.

All electrodes of this example have equivalent parameters a=0.1 µm and c=10 µm

Similar thermal poling treatment conditions were used: 300° C., 1 kV, under N2 atmosphere.

In these cases, the index gradient profiles allow the formation of micro-lenses which focal distances are indicated (variation from 0.2 to 3 mm).

FIG. 9 *a*) represents the refractive index profile obtained for b=20 µm a=0.1 µm and c=10 µm. The obtained microlenses have a focal distance f=0.2 mm;

FIG. 9 *b*) represents the refractive index profile obtained for b=40 µm a=0.1 µm and c=10 µm. The obtained microlenses have a focal distance f=1.2 mm;

FIG. 9 *c*) represents the refractive index profile obtained for b=60 µm a=0.1 µm and c=10 µm. The obtained microlenses have a focal distance f=1.8 mm;

FIG. 9 *d*) represents the refractive index profile obtained for b=80 µm a=0.1 µm and c=10 µm. The obtained microlenses have a focal distance f=3 mm.

Influence of the Parameter c:

FIG. 10 presents the refractive index variations obtained on a chalcogenide glass poled with two electrodes which geometry varies according to the parameter c=5 µm and 30 µm.

Parameters a and b of the electrode geometry are constant and respectively equal to a=100 nm and b=40 µm.

Similar thermal poling treatment conditions were used: 210° C., 1.1 kV, under N2 atmosphere.

The invention claimed is:

1. A device for inducing by thermal poling a spatially controlled refractive index gradient inside at least one amorphous inorganic material to be treated, said device comprising:
    a structured electrode arranged on a surface or in proximity to the surface of the material to be treated and having a structure defined by at least three geometrical parameters;
    at least one dielectric material,
    wherein
    the structured electrode comprises at least one conductive zone and at least one non-conductive zone and the structure electrode is confined between the amorphous inorganic material to be treated and the dielectric material, the refractive index gradient being controlled in three directions of space by the at least three geometrical parameters defining the structure of the structured electrode, and wherein a value of each of the at least three geometrical parameters is selected to induce said spatially controlled refractive index gradient inside said amorphous inorganic material.

2. The device according to claim 1, wherein the structured electrode comprises an electrical conductive material alternated by volumes of air or an atmosphere of a gas different from air, wherein at least one parameter of the gas selected from the group consisting of a composition of the gas, a temperature of the gas, a density of the gas, a pressure of the gas and any combination thereof is controlled.

3. The device according to claim 2, wherein the gas is an inert gas.

4. The device according to claim 1, wherein the structured electrode is a composite material made of an alternation of conductive material and non-conductive material.

5. The device according to claim 1, wherein the structured electrode is made of a metallic grid.

6. The device according to claim 1, wherein the structured electrode is an electronic conductive layer deposited on an electrically insulating substrate.

7. The device according to claim 1, wherein said at least three geometrical parameters of the structured electrode are:
    a distance between the dielectric material to be treated and the confining dielectric material;
    a distance between two conductive zones connected to an electric potential;
    a size of the zone of the structured electrode in direct contact with the amorphous material to be treated.

8. The device according to claim 7, wherein the distance between the dielectric material to be treated and the confining dielectric material is comprised between 50 nm and 1 mm, the distance between two conductive zones is comprised between 0.1 µm and 1 mm and the size of the zone of the structured electrode in direct contact with the amorphous material to be treated is comprised between 100 nm and 1 mm.

9. The device according to claim 1, comprising at least a first reference electrode.

10. The device according to claim 1, comprising a first reference electrode and a second reference electrode.

11. The device according to claim 10, wherein the first reference electrode is connected to a first reference electric potential and the first reference electrode is in contact with the material to be treated and the second reference electrode is connected to a second reference electric potential and the second reference electrode is in contact with the dielectric material.

12. An amorphous inorganic material comprising a refractive index gradient controlled in the three directions of space, said refractive index gradient being induced by the device of claim 1.

13. A method for inducing by thermal poling a spatially controlled gradient of a refractive index in an amorphous dielectric material comprising:
    confining a structured electrode between the amorphous material to be treated and a dielectric material, said structured electrode being arranged on a surface or in proximity to the surface of the material to be treated and having a structure defined by at least three geometrical parameters, said structured electrode comprising at least one conductive zone and at least one non-conductive zone;
    performing a thermal poling treatment for inducing a spatially controlled gradient of a refractive index, the refractive index gradient being controlled in three directions of space by the at least three geometrical parameters defining the structure of the structured electrode;

removing the structured electrode.

14. An amorphous inorganic material according to claim 12 comprising an array of micro-lenses.

15. The method according to claim 13, further comprising:

preliminary defining the geometrical characteristics of the structured electrode in view of obtaining a given refractive index profile;

placing at least one reference electrode providing a voltage reference.

16. The method according to claim 13, wherein the thermal poling treatment comprises generating a plasma in a region of space confined between the material to be treated and the dielectric material.

17. The method according to claim 13, wherein the amorphous inorganic material to be treated is a chalcogenide glass or an oxide glass of the soda-lime silicate family, the dielectric material is an oxide glass of the soda-lime silicate family, the structured electrode is a thin layer of ITO deposited on an electrically insulating substrate and partially ablated to induce a structuration of alternating electrically conductive and electrically insulating zones or a nickel grid and the controlled atmosphere is formed by $N_2$.

18. An amorphous inorganic material produced with the method according to claim 13.

* * * * *